Oct. 16, 1956  R. H. ZINKIL ET AL  2,766,461
RESILIENT MOUNTING FOR PLUMBING FIXTURES AND THE LIKE
Filed Nov. 20, 1952  3 Sheets-Sheet 3
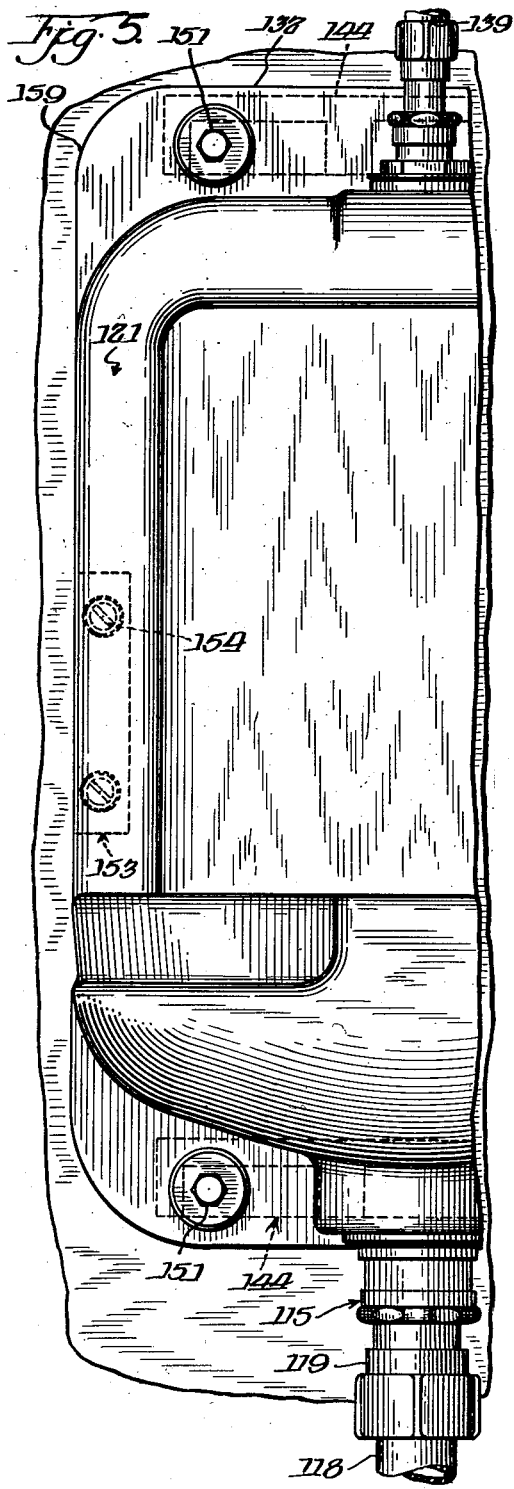
Inventors.
Roy H. Zinkil,
Thomas P. Newman, &
John V. Novak.
By Joseph O. Langsett United States Patent Office 2,766,461
Patented Oct. 16, 1956

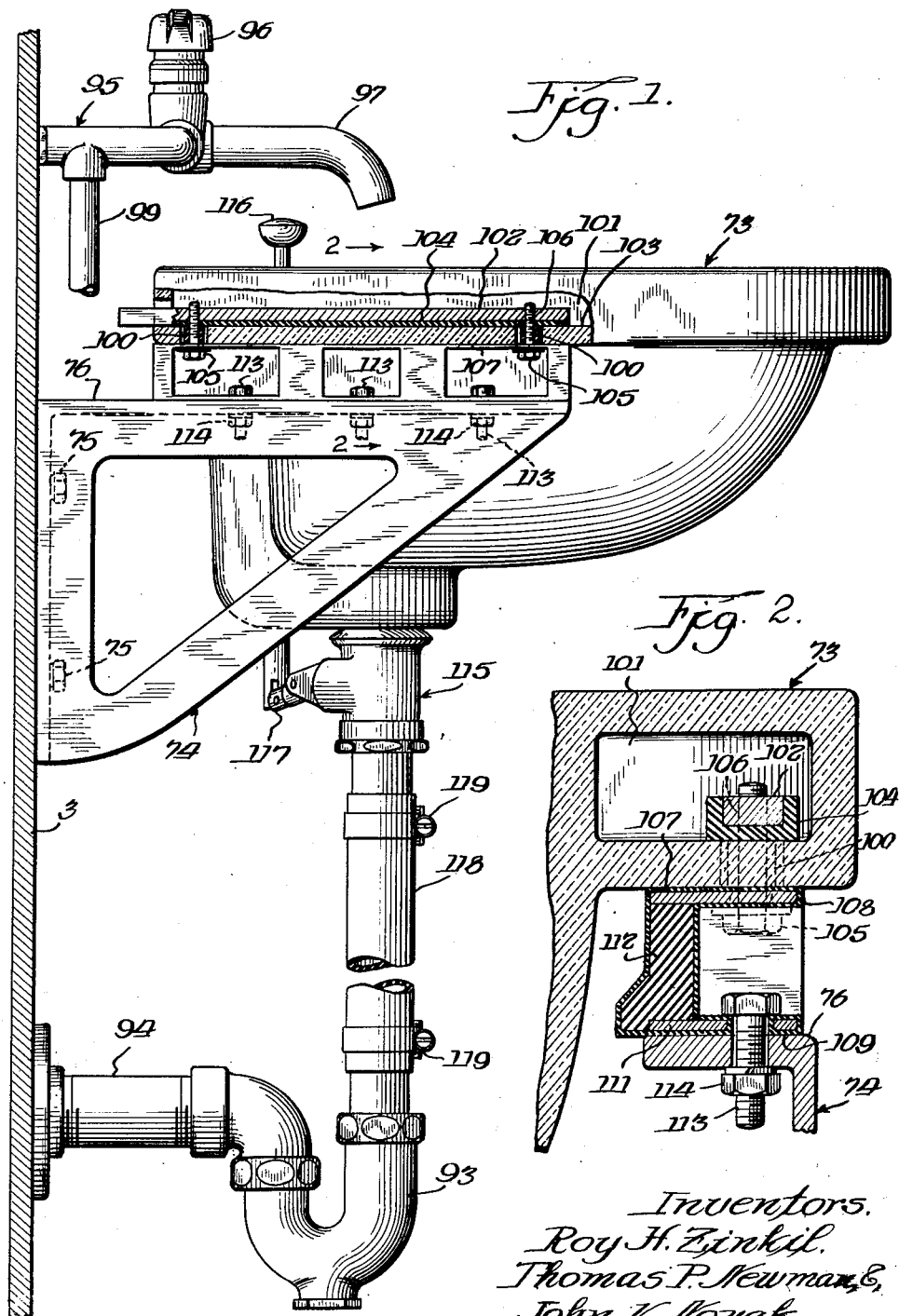

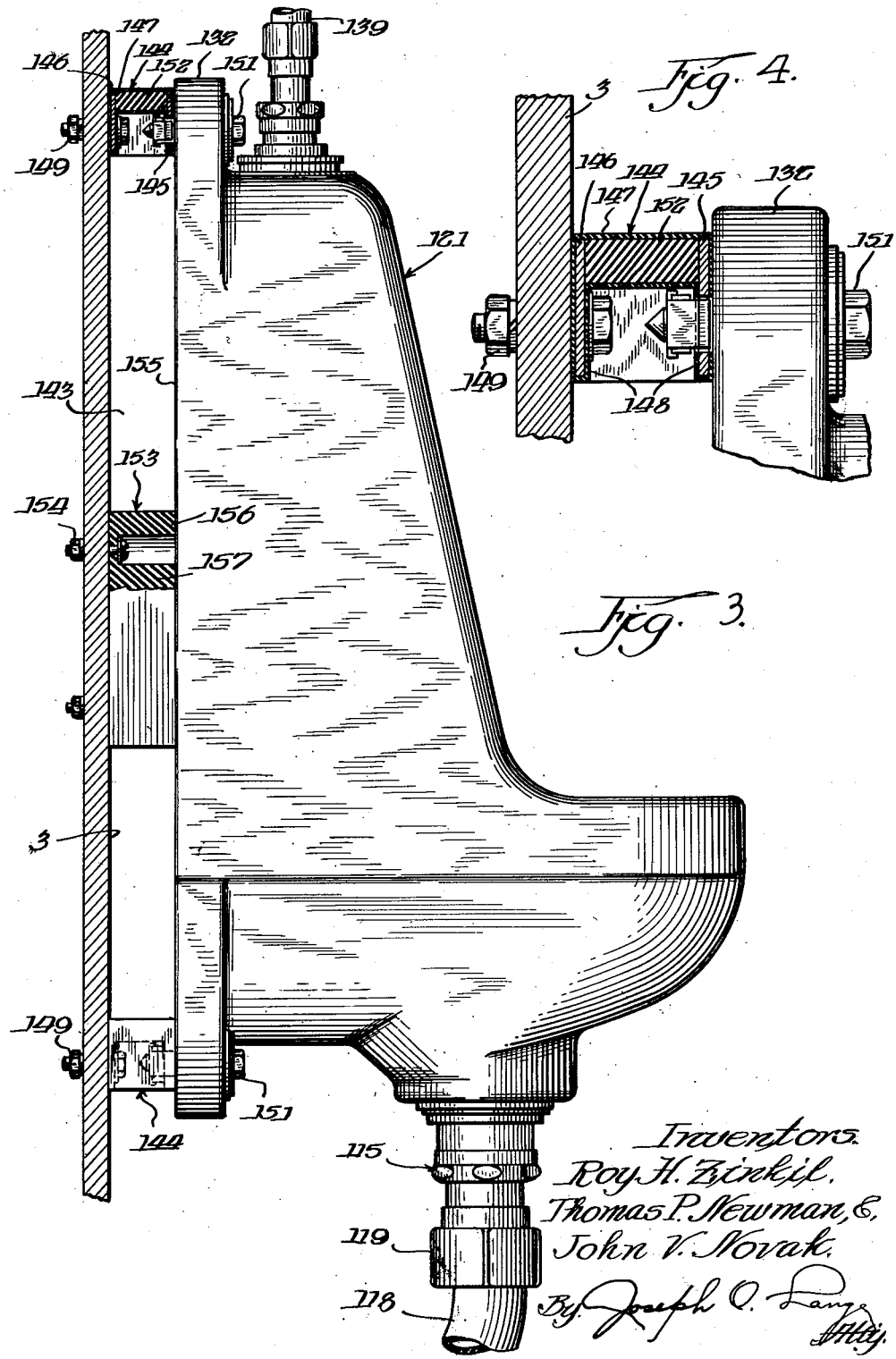

2,766,461

RESILIENT MOUNTING FOR PLUMBING FIXTURES AND THE LIKE

Roy H. Zinkil, Oak Park, Thomas P. Newman, Geneva, and John V. Novak, Chicago, Ill., assignors to Crane Co., Chicago, Ill., a corporation of Illinois Application November 20, 1952, Serial No. 321,618

3 Claims. (Cl. 4—170)

This invention relates generally to resilient mountings and more especially is concerned with concussion resistant coupling mountings suitable for cushioning plumbing fixtures and the like from harmful forces, impacts, and vibrations, and is adaptable for use with a wide variety of fixture installations involving the transmission of fluids in which shock to a greater or lesser degree may be present.

At the outset, in order to obtain a better understanding and a greater appreciation of the background of this inventive contribution, it should be understood that there are numerous installations, as, for example, aboard ship or on vehicles or trains or even in stationary installations wherein such fixtures as those above referred to are subjected to shock or impact or a combination of other harmful forces. As an example, for many years, vitreous china fixtures have been used aboard ship, but such installations have been found objectionable because in many instances the relatively fragile vitreous china fixtures were either destroyed or else seriously damaged upon subjection to impact or shock. As a result, in many cases, installations were modified to use metal-alloy fixtures, say of the copper-nickel alloy type, for example, as distinguished from vitreous ware, to avoid the objectionable breakage and other damage alluded to. However, because of the fact that in many cases, such metallic materials have become scarce and difficult to obtain as in times of war threats, police actions of and during wartime conditions and have assumed greater importance in other phases of national defense, there has been a desire to use vitreous chinaware wherever possible.

Further, it has been found that in fragmentation tests under actual gunfire conditions, the hazardous fragmentations of the metal fixtures were greater than those from the vitreous china fixtures.

Also because the vitreous china fixtures are relatively easier to maintain in a sanitary condition, fixtures in this material are more acceptable.

Therefore, it is one of the more important objects of this invention to provide for a resilient mounting which protects the vitreous china fixtures and the like against such injury or shock arising from concussion or shock, and provides relatively greater simplicity of construction, ease of installation and effectiveness in operation.

It is also an important object to provide for a resilient mounting which is relatively neat and does not detract from the appearance of the fixture and which lends itself to the easy maintenance of sanitary conditions adjacent the fixture and the mounting of the latter member.

A further important object is to provide for a resilient mounting of the general character hereinafter described which is relatively economical in its initial cost and is comparatively simple and cheap to inspect, maintain, replace or repair.

A further important object of this invention is to provide in connection with the concussion mounting for the use of a novel snubbing means comprising spaced-apart rubber-like blocks of general application and which serve the purpose of dampening or snubbing the fixture movement at the time of impact and the recoil or rebound occurring immediately thereafter, thereby to reduce substantially the strain on the fixture and minimizing previous resultant breakage.

A further important object is to provide and arrange for said snubbing means in such manner that it may be easily fastened, if desired, or in any other manner not necessarily requiring fastening and applied between the floor or wall and the resiliently mounted fixture so that said snubbing means may be either wedged therebetween or else fastened to such wall or floor, to the fixture or to both.

Other objects and advantages will become more readily apparent upon proceeding with the specification read in light of the accompanying drawings, in which, Fig. 1 is a form of the novel resilient type of concussion mounting embodying our invention.

Fig. 2 is a magnified partial sectional view of the mounting referred to in Fig. 1, taken on the line 2—2 of Fig. 1.

Fig. 3 is a side exterior view in partial section showing a modified form of concussion mounting for a wall-mounted plumbing fixture and with a form of snubbing means applied thereto.

Fig. 4 is a magnified partial sectional view of the concussion resistant resilient mounting shown in Fig. 3.

Fig. 5 is a partial front exterior view of the wall mounted fixture illustrated in Fig. 3.

Similar reference numerals refer to similar parts throughout the several views.

Referring to the structure shown in Fig. 1, the carrier or support 74 is shown mounted rigidly upon the wall 3 by means of the usual bolts 75. The lavatory fixture 73 may be suitably formed with a chamber, as at 101, to receive a long plate or strip member 102 having between it and the lower flange 103, a resilient gasket 104, the bolt 105 being threadedly attached to the plate 102 as at 106, the lower end portion of bolt 105 attaching the apertured plate or strip 107 to the flange 103 of the lavatory. The latter member is preferably covered by means of the resilient coatings 108 and 109 at top and bottom respectively (see Fig. 2), having between the upper plate or strip 107 and the lower apertured strip 111 a resilient core member 112 similarly composed of rubber-like or resilient material to absorb concussion or shock therebetween. It is preferably held to the upper surface 76 of the carrier 74 by means of the bolts 113 bearing against the coating 109 as shown to thereby position and support the fixture 73 at its outer flange periphery, as defined by the chamber 101, firmly upon the carrier while permitting resilient response to any shock condition encountered, the assembly being held fixedly thereto by means of the nut 114. For purposes of providing additional protection against breakage resulting from shock or impact, the upper bolts 105 may be suitably covered by a sleeve 100, preferably consisting of a soft resilient material for cushioning purposes.

The lavatory fixture 73 is also provided with the usual waste outlet generally designated 115 having an actuating mechanism 116 operating customarily through the levers 117 and having the flexible hose connections 118 for attachment to a trap 93 fixedly connected to the wall 3 by means of the discharge pipe 94. Thus, here, as also described in connection with the other figures, the fixture 73 is so mounted as to permit substantially a floating condition of the lavatory relative to the wall 3 and to the carrier 74 and therefore will not be adversely affected by shock even when extending to the waste discharge line because of the employment of the flexible tubing 118. The hose clamp members 119 at upper and lower ends of the tubing will provide for a suitable leakproof connection between the rigid members constituting the discharge outlet. The usual inlet supply fixtures referred to as the inlet 95, the valve 96, and the discharge spout 97 are preferably mounted independently relative to the fixture 73 and therefore need not necessarily employ a resilient mounting for such purpose as previously described, although obviously, they may be so used if desired to protect the valve or other operating parts of the inlet supply mechanism.

The resilient mounting thus far described has been applied to lavatories on wall mounted carriers. Of course, the latter may be supported on the floor with cushioning means applied in a similar manner between the supporting stand or pedestal of the fixture and the floor to provide the same benefits for the protection of the lavatory fixture against concussion.

It is important to note that in the structure above described that a space 143 exists between the wall 3 and the back of the flange of the fixture and which has been found useful for an additional protective purpose as hereinafter described in connection with Figs. 3 and 4.

Attention is directed to Figs. 3, 4 and 5 wherein a urinal fixture, generally designated 121, is mounted on the wall 3 and employing the spaced-apart resilient mountings generally designated 144. The resilient mountings 144 comprise oppositely disposed plates 145 and 146 suitably covered by a resilient material 147 outwardly and inwardly covered as at 148. The plate 146 is preferably apertured to receive the attaching bolts 149 and similarly the outward plate 145 is apertured to receive the attaching bolt 151. Between the plates 145 and 146, a rubber core or resilient member 152 is used as the cushioning means between the respective means of attachment constituted by the bolts 149 and 151 respectively. Since separate spaced-apart units constituting the resilient members 144 are employed, it will be clear that a substantial space 143 is formed therebetween the width of which space is determined by the amount of compression or tension to which resilient core 152 is subjected. It has been found that the space 143 serves the useful purpose of permitting the interposition in any suitable manner of a resilient snubber block generally designated 153, which may be attached as at 154 to the wall and positioned between the surface 155 of the fixture and the wall 3, so as to place the snubber portions 156 and 157 to accomplish the desired snubbing action. The interposition of the snubber block 153 in the manner just described provides an additional advantage in that if at the time of impact the fixture 121 and the supporting plate or wall 3 move transversely relatively to each other by reason of the resiliency of the mounting 144 the snubbing means 153 will retard or minimize the initial shock and recoil to the desired extent and thereby prevent undue strain on the flange 132 of the fixture. Thus, in connection with the figures previously described, it will be clear that if a resilient mounting means is employed which does not extend continuously around the base or flange of the fixture as illustrated, but instead are provided in spaced-apart relation as shown in Figs. 3 and 4, the snubbing means just described may also be applied to these fixtures to bring about the same advantage. Therefore, it should be understood that while the snubbing means has been only shown and described in connection with Figs. 3, 4, and 5 it may easily be used with other fixtures with the resilient mounting means suitably modified to permit the interpositioning of the snubbing means 153.

It should of course be clear that while several embodiments have been described in connection with featuring the essential elements of our invention, and while the description has been applied to plumbing fixtures or the like, the novel resilient mounting hereinabove described may be used with other types of fixtures, in which the rigidity of the fixture or the mounting may be one requiring the same general cushioning treatment. Therefore, it should be understood in construing the claims that such broad scope of application is not waived.

We claim:

1. In a concussion resistant coupling assembly for attaching a plumbing fixture or the like to a base member, the combination of an elongated stick-like coupling mounted on an outer edge of the fixture between the base member and the fixture, the said coupling comprising a pair of oppositely disposed elongated apertured strip members in spaced-apart superposed relation, an elongated resilient core member of substantially less width than said strip members and cemented thereto and extending longitudinally for the length of the strip members along an oppositely disposed edge of each of the said apertured strip members in the same vertical plane thereby to form a combined core and strip assembly of substantially C-cross section, a plurality of bolt means transversely engaging the apertured portions of each of the said strip members and the edge of the fixture and base member, the said core member having spaced apart transverse projections filling the space between the strip members and extending forwardly of the said core member for a distance substantially equal to the width of said strip members to form forwardly open pockets for receiving said bolt means, the said bolt means being mounted in front of but spaced apart from the said elongated resilient core member to permit the latter member to flex in a plurality of directions in the absorption of compression loads and impacts imposed on the fixture, the said bolt means being assembled and removable through the open front of the said pockets formed between said strip members.

2. In a concussion resistant coupling assembly for attaching a plumbing fixture or the like to a base member, the combination of an elongated coupling mounted on an outer edge of the fixture between the base member and the fixture, the said coupling comprising a pair of oppositely disposed elongated apertured strip members in spaced apart superposed relation, an elongated resilient core member of substantially less width than said strip members and positioned between the latter to extend longitudinally along oppositely disposed edges of each of the said apertured strip members thereby to form a combined resilient core and strip assembly of substantially C-cross section for substantially the full length of the said strip members, bolt means bearing around said apertured portions of the said strip members to connect the latter to the fixture and to the base member and being received respectively upon upper and lower surfaces defining the open front portion of the C-section formed by the pair of the said superposed strip members for access to the said bolt means and attaching said coupling to the base member and fixture, a resilient rubber-like coating for the said coupling, the said strip members and resilient core being covered by said coating, the said bolt means bearing against the said rubber-like coating whereby to impart to said assembly the additional resilience in the rubber-like coating.

3. In a concussion resistant coupling assembly for attaching a plumbing fixture or the like to a base member, the combination of an elongated coupling mounted on outer edge portions of the fixture between the base member and the said fixture, the said coupling comprising a pair of oppositely disposed elongated apertured relatively stiff plate members in substantially the same vertical plane in spaced apart relation, an elongated resilient core member of a width substantially less than said plate members and of a length substantially the same as the pair of strip members, the said core members extending longitudinally along oppositely disposed edges of each of the said apertured plate members thereby to form a combined resilient core and plate assembly of substantially C-cross section extending for the full length of the said plate members, bolt means engaging said apertured portions of the said plate members, spaced apart blocks of rubber-like material filling a portion of the space of the C-section between the said stiff plate members thereby to span the open end portion of the said C-section formed by the said assembly of the said core and the said pair of plate members, the said predeterminately spaced apart rubber-like blocks forming transverse openings within the coupling to permit access to the said bolt means for effecting attachment of said coupling to the base member and fixture, the said blocks providing additional resilient support for the fixture to supplement the resilient support provided by the said core member.

References Cited in the file of this patent

UNITED STATES PATENTS

| Number | Name | Date |
|---|---|---|
| 961,685 | Cosgrove | June 14, 1910 |
| 1,578,849 | Rogers | Mar. 30, 1926 |
| 1,791,261 | Ballman | Feb. 3, 1931 |
| 1,834,450 | Flinterman | Dec. 1, 1931 |
| 1,871,963 | Dill | Aug. 16, 1932 |
| 2,014,466 | Cheyney | Sept. 17, 1935 |
| 2,041,353 | Kenney et al. | May 19, 1936 |
| 2,138,176 | Keys | Nov. 29, 1938 |
| 2,152,719 | Williams | Apr. 4, 1939 |
| 2,264,082 | Kintz | Nov. 25, 1941 |
| 2,273,869 | Julien | Feb. 24, 1942 |
| 2,351,725 | Wack | June 20, 1944 |
| 2,447,712 | Nathan | Aug. 24, 1948 |
| 2,538,658 | Saurer | Jan. 16, 1951 |
| 2,540,130 | Lee | Feb. 6, 1951 |

FOREIGN PATENTS

| Number | Country | Date |
|---|---|---|
| 450,418 | Great Britain | July 17, 1936 |